(12) United States Patent
Phillips et al.

(10) Patent No.: US 7,103,579 B1
(45) Date of Patent: Sep. 5, 2006

(54) INTERNET BASED CHECK CASHING AND CLEARING METHOD, APPARATUS AND ARTICLE OF MANUFACTURE

(75) Inventors: Patrick M. Phillips, Keller, TX (US); Dennis G. Brown, Fort Worth, TX (US); George A. Gouffray, Fort Worth, TX (US); Roger A. Burk, Midlothian, TX (US); Ronnie D. Phillips, Keller, TX (US); David P. Higbee, Burleson, TX (US); Jay D. Lynch, Fort Worth, TX (US); Lawrence M. Brown, Simi Valley, CA (US); David C. Griffin, Austin, TX (US)

(73) Assignees: Electronic Clearinghouse, Inc., Agoura Hills, CA (US); National Bank Drafting Systems, Inc., Fort Worth, TX (US)

( * ) Notice: Subject to any disclaimer, the term of this patent is extended or adjusted under 35 U.S.C. 154(b) by 0 days.

(21) Appl. No.: 09/536,006

(22) Filed: Mar. 23, 2000

(51) Int. Cl.
*G06F 17/60* (2006.01)
(52) U.S. Cl. .............................. 705/77; 705/1; 705/40; 705/75; 705/53; 380/24; 380/25
(58) Field of Classification Search ................. 705/64, 705/77, 1, 40, 75, 53; 380/24, 25
See application file for complete search history.

(56) References Cited

U.S. PATENT DOCUMENTS

| | | | |
|---|---|---|---|
| 3,588,449 A | 6/1971 | Paterson | |
| 3,824,544 A | 7/1974 | Simjian | |
| 3,845,470 A | 10/1974 | Schuller | |
| 3,852,571 A | 12/1974 | Hall et al. | |
| 4,270,042 A | 5/1981 | Case | |
| 4,321,672 A * | 3/1982 | Braun et al. | 705/42 |
| 4,404,649 A | 9/1983 | Nunley et al. | |
| 4,523,330 A | 6/1985 | Cain | |
| 4,580,040 A | 4/1986 | Granzow et al. | |
| 4,617,457 A | 10/1986 | Granzow et al. | |
| 4,672,377 A | 6/1987 | Murphy et al. | |
| 4,673,802 A | 6/1987 | Ohmae et al. | |
| 4,678,895 A | 7/1987 | Tateisi et al. | |
| 4,678,896 A | 7/1987 | Carlson et al. | |
| 4,727,243 A | 2/1988 | Savar | |
| 4,743,743 A | 5/1988 | Fukatsu | |
| 4,758,714 A | 7/1988 | Carlson et al. | |

(Continued)

FOREIGN PATENT DOCUMENTS

DE             3216429 A1     11/1983

(Continued)

OTHER PUBLICATIONS

JRC Financial Services, 1999 pp. 1-3.*

(Continued)

*Primary Examiner*—James P. Trammell
*Assistant Examiner*—John M. Winter
(74) *Attorney, Agent, or Firm*—Brooks Kushman P.C.

(57) ABSTRACT

A method apparatus and article of manufacturing for using a computer to electronically clear and cash a check submitted to an on-line merchant from an on-line consumer by electronic means is provided.

First, an input of check information submitted by a consumer by electronic means is accepted. Next the accuracy of the check information is verified and then is presented for clearing through the Federal Reserve's Automated Clearing House. Finally, the consumer's checking account from which the check was drawn is debited by the amount indicated in the check information and the merchant's account is credited by the amount indicated in the check information.

6 Claims, 5 Drawing Sheets

U.S. PATENT DOCUMENTS

| | | |
|---|---|---|
| 4,810,866 A | 3/1989 | Lord, Jr. |
| 4,823,264 A | 4/1989 | Deming |
| 4,933,536 A | 6/1990 | Lindemann et al. |
| 4,934,772 A | 6/1990 | Sakuma et al. |
| 4,948,174 A | 8/1990 | Thomson et al. |
| 5,053,607 A | 10/1991 | Carlson et al. |
| 5,111,395 A | 5/1992 | Smith et al. |
| 5,121,945 A | 6/1992 | Thomson et al. |
| 5,175,682 A | 12/1992 | Higashiyama et al. |
| 5,201,010 A | 4/1993 | Deaton et al. |
| 5,220,501 A | 6/1993 | Lawlor et al. |
| 5,237,159 A | 8/1993 | Stephens et al. |
| 5,237,620 A | 8/1993 | Deaton et al. |
| 5,305,196 A | 4/1994 | Deaton et al. |
| 5,342,094 A | 8/1994 | Duck |
| 5,383,113 A | 1/1995 | Kight et al. |
| 5,388,165 A | 2/1995 | Deaton et al. |
| 5,412,190 A | 5/1995 | Josephson et al. |
| 5,430,644 A | 7/1995 | Deaton et al. |
| 5,440,106 A | 8/1995 | Duck |
| 5,448,471 A | 9/1995 | Deaton et al. |
| 5,465,206 A | 11/1995 | Hilt et al. |
| 5,484,988 A | 1/1996 | Hills et al. |
| 5,504,677 A | 4/1996 | Pollin |
| 5,677,955 A | 10/1997 | Doggett et al. |
| 5,679,938 A | 10/1997 | Templeton et al. |
| 5,727,249 A * | 3/1998 | Pollin ............................ 705/40 |
| 5,783,808 A | 7/1998 | Josephson |
| 5,832,460 A * | 11/1998 | Bednar et al. ................. 705/27 |
| 5,893,080 A * | 4/1999 | McGurl et al. ................ 705/40 |
| 6,164,528 A | 12/2000 | Hills et al. |
| 6,230,148 B1 * | 5/2001 | Pare et al. .................... 380/229 |
| 6,243,689 B1 * | 6/2001 | Norton ........................... 705/18 |
| 6,283,366 B1 | 9/2001 | Hills et al. |

FOREIGN PATENT DOCUMENTS

| | | |
|---|---|---|
| FR | 2 441 222 | 6/1980 |
| JP | 04-62921 | 2/1992 |
| WO | WO 9522113 * | 1/1995 |

OTHER PUBLICATIONS

Fedtalk Financial services update of the Fedreal Reserve Bank of Boston, Winter 1999, p. 3.*

Job service North Dakota, electronic funds transfer guide (date unknown).*

LML Payments Systems, Inc., *LML Adds Third Patent Regarding Electronic Checks to Intellectual Property Estate*, Sep. 17, 2001, pp. 1-2, Yahoo! Finance.

* cited by examiner

INTERNET BASED CHECK CASHING AND CLEARING METHOD, APPARATUS AND ARTICLE OF MANUFACTURE

BACKGROUND OF THE INVENTION

I. Field of the Invention

The present invention relates generally to the field of Internet commerce and more specifically to a method, apparatus and article of manufacture to enable consumers to purchase items from Internet merchants with funds drawn from the consumer's checking account.

II. Relevant Art

One of the newest and most rapidly expanding areas of commerce is the use of the Internet to conduct business, or so-called "e-commerce." Every day, millions of dollars of sales are made over the Internet. Presently, the vast majority of these sales are paid for by credit card. The use of a credit card to pay for goods has the advantages of allowing both customers and merchants to have a convenient and generally reliable form of payment. However, from a consumer's point of view payment by credit card is disadvantageous in that it requires that a consumer first own a credit card, and second, the consumer must often be willing to incur a short term debt at the relatively high interest rate charged by most credit card companies. From a merchant's point of view, payment by credit card is disadvantageous because it often results in higher processing fees than would be charged for cash or check transactions. Accordingly, it would be advantageous for consumers to have the option of paying for Internet purchases by a check drawn from a standard bank checking account.

SUMMARY OF THE PREFERRED EMBODIMENT

To overcome the disadvantages and problems in the prior art described, and to overcome other disadvantages and problems that will become apparent upon reading and understanding the present specification, the present invention discloses a method, apparatus, and article of manufacture for an Internet based system for cashing and clearing checks drawn on consumer's checking account.

In accordance with the present invention, a technique for using a computer to electronically clear and cash a check submitted to an on-line merchant from an on-line consumer is provided. Initially, the computer must accept an input of check information from a consumer. The computer then verifies the accuracy of the check information, presents the check information for clearing through the Federal Reserve's Automated Clearinghouse, debits the consumer's checking account on which the check was drawn in an amount indicated in the check information, and credits the merchant's account in the amount indicated in the check information.

DESCRIPTION OF THE PREFERRED EMBODIMENTS

In the following description of the preferred embodiments, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
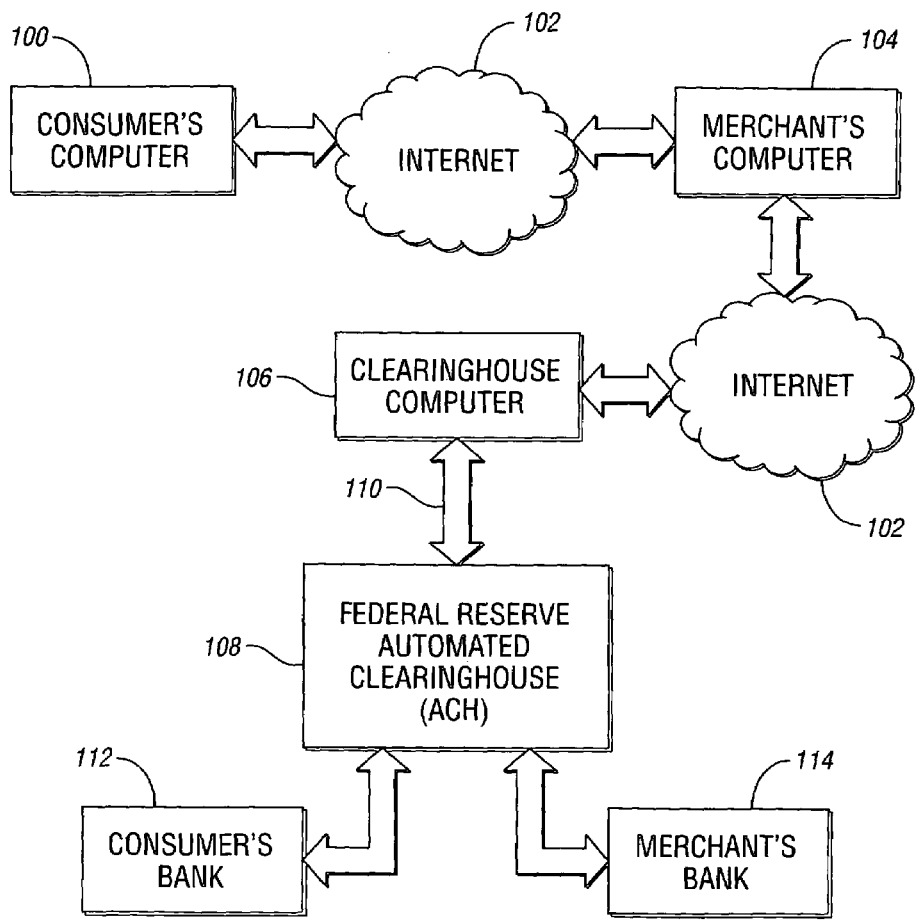
FIG. 1 schematically illustrates the hardware environment of the present invention.

Typically, a consumer will access the Internet via a home or office computer 100 connected to the Internet 102 by modem, cable modem, ISDN line, T1 line or other suitable means. (See FIG. 1). By Internet protocols, the consumer accesses a merchant's on-line web-site, typically located on the merchant's computer system 104 or the computer system of an independent service provider. At this time, the consumer selects an item or items to be purchased from the merchant via the merchant's on-line web-site and submits information to the merchant such as credit card information or, in the case of the present invention, check information, to enable the purchase of the preselected goods.

The merchant's computer transmits, via the Internet 102, this check information from the merchant's computer to a dedicated clearinghouse computer 106. It will be understood that the present invention is not limited to clearing and cashing checks submitted by only one merchant web-site, but in fact is capable of processing check information from a large number of merchants. As further described below, the clearinghouse computer performs certain functions based on the check information, readies the file for submission to the Federal Reserve Automated Clearing House Computers, and then submits the check information to the Automated Clearing House 108 via a dedicated line 110. After the check is processed, information is submitted from the Federal Reserve Automated Clearing House to the consumer's bank 112 and the merchant's bank 114 to enable the consumer's checking account to be debited, and the merchant's checking account to be credited.

This description of the hardware environment generally required of the present invention is provided for illustration purposes only and those skilled in the art will recognize many modifications may be made without departing from the scope of the present invention.

Figure 2:
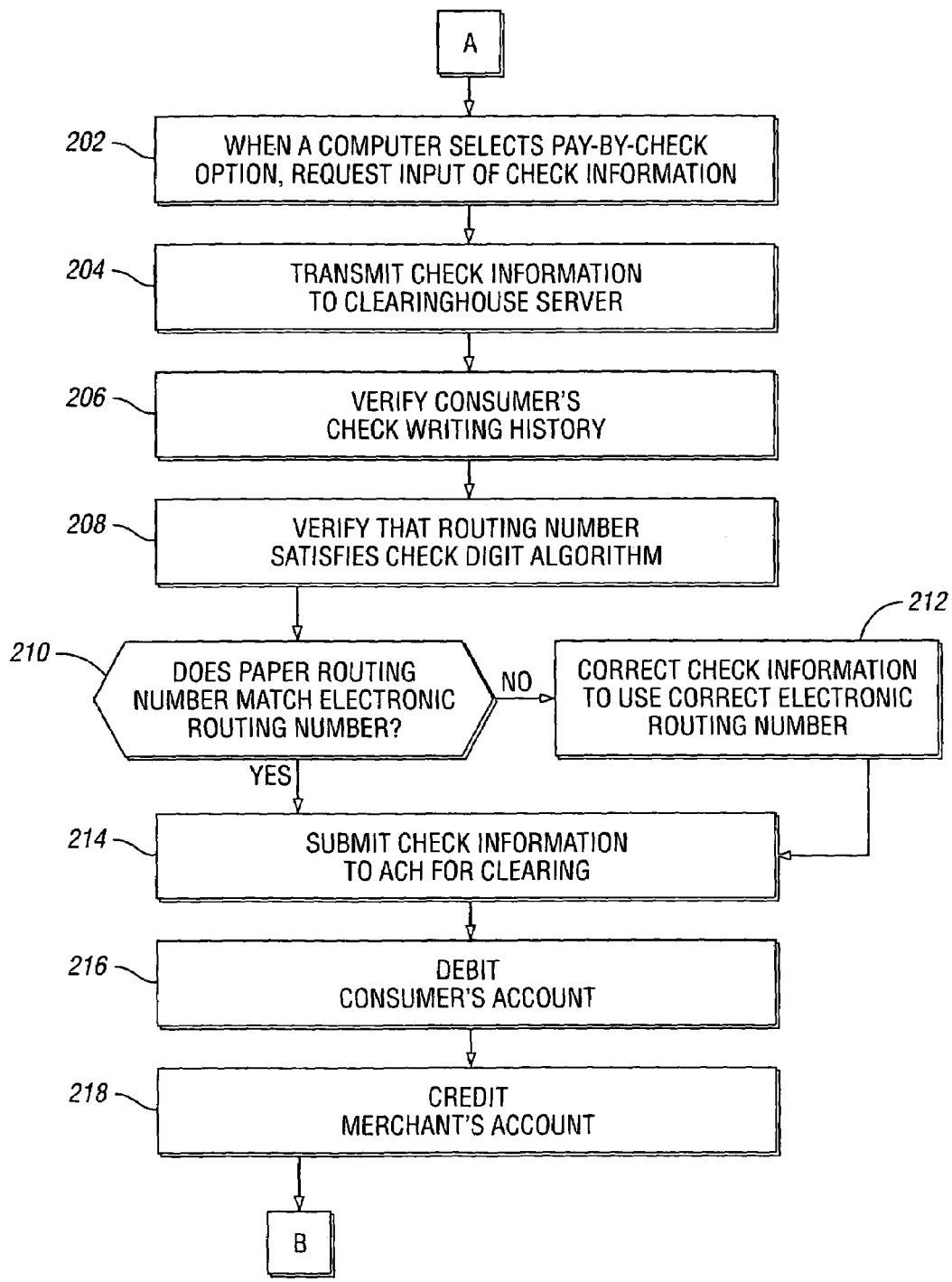
FIG. 2 schematically illustrates the steps performed in accordance with a preferred embodiment of the invention.
Figure 2:
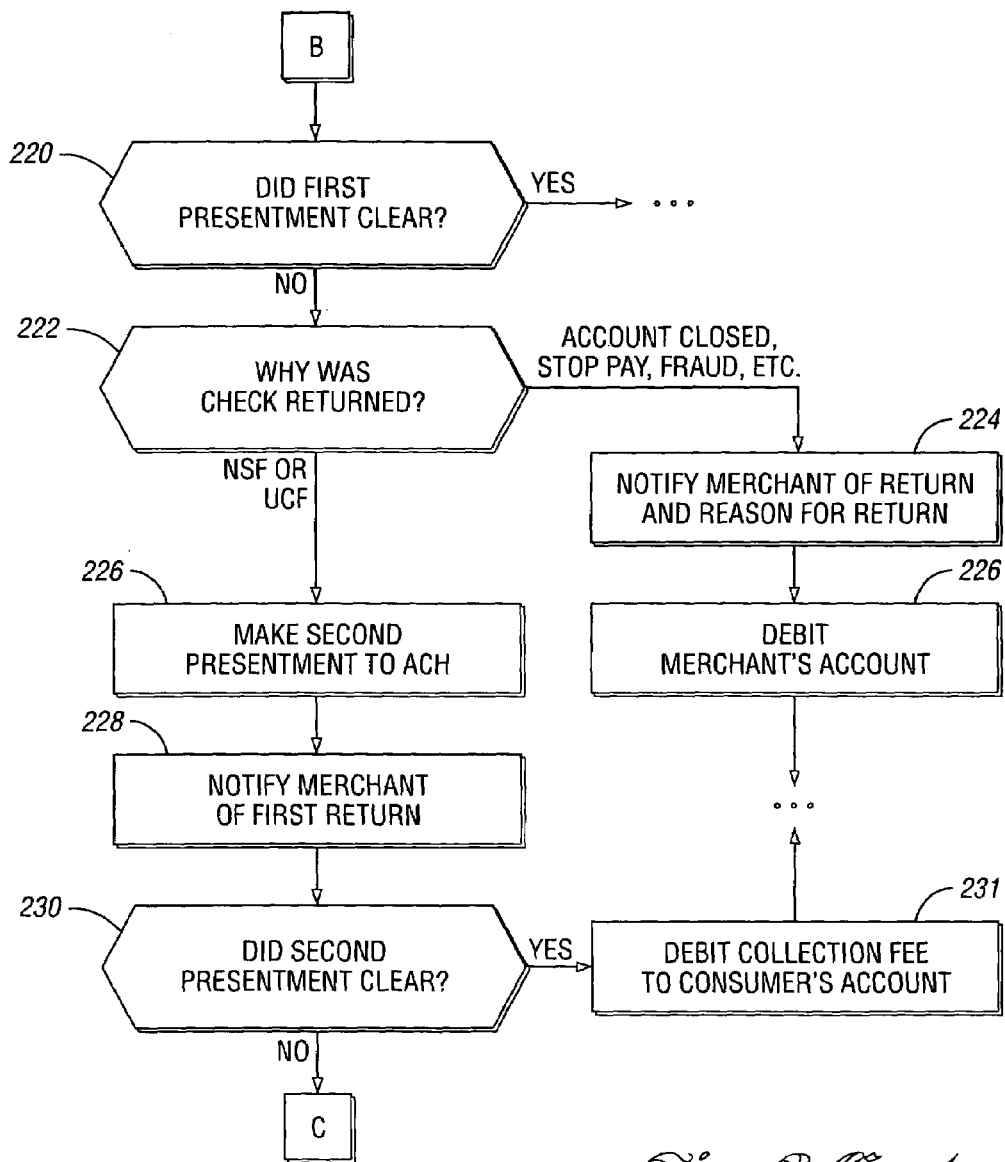
Figure 2:
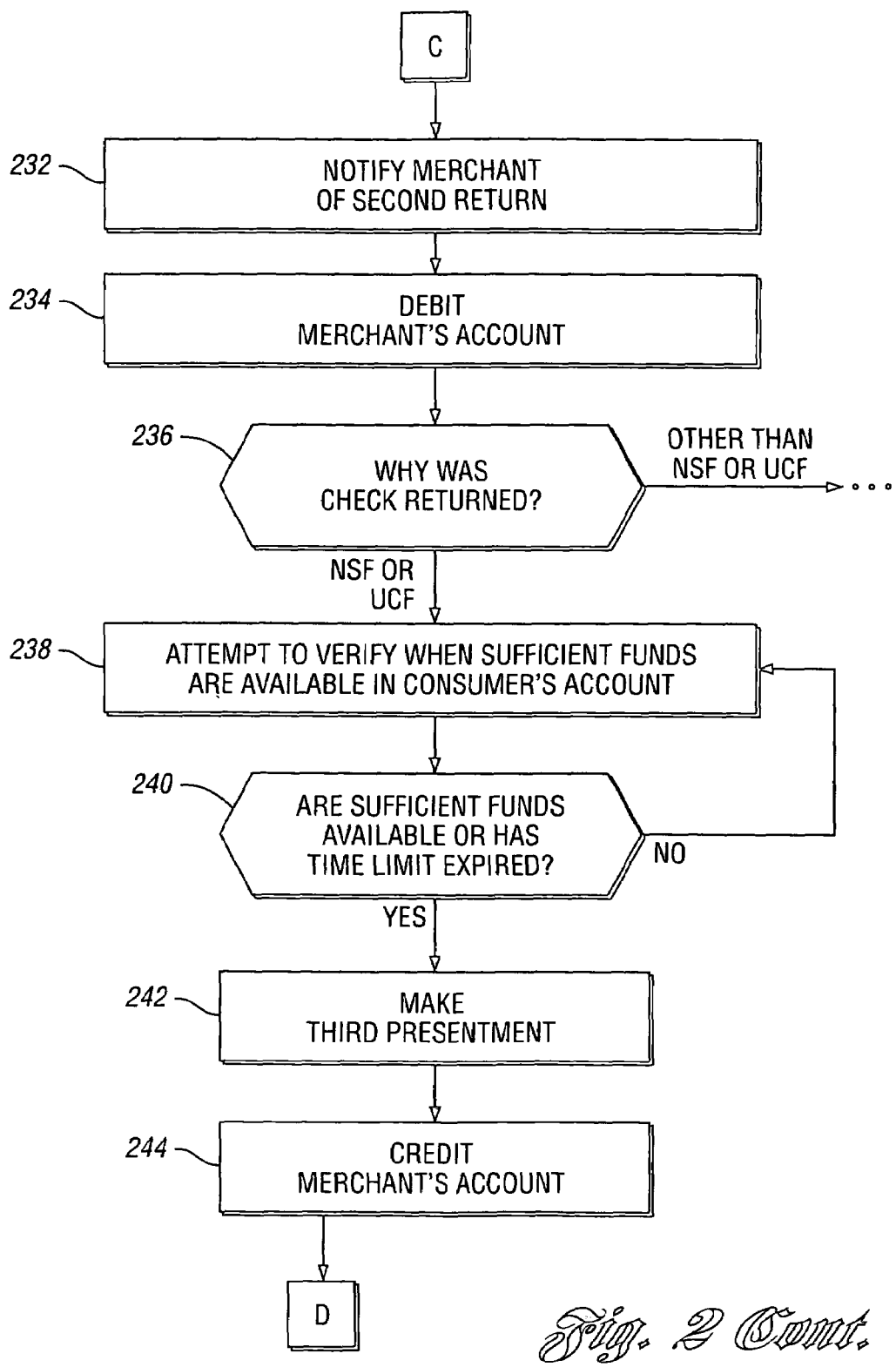
Figure 2:
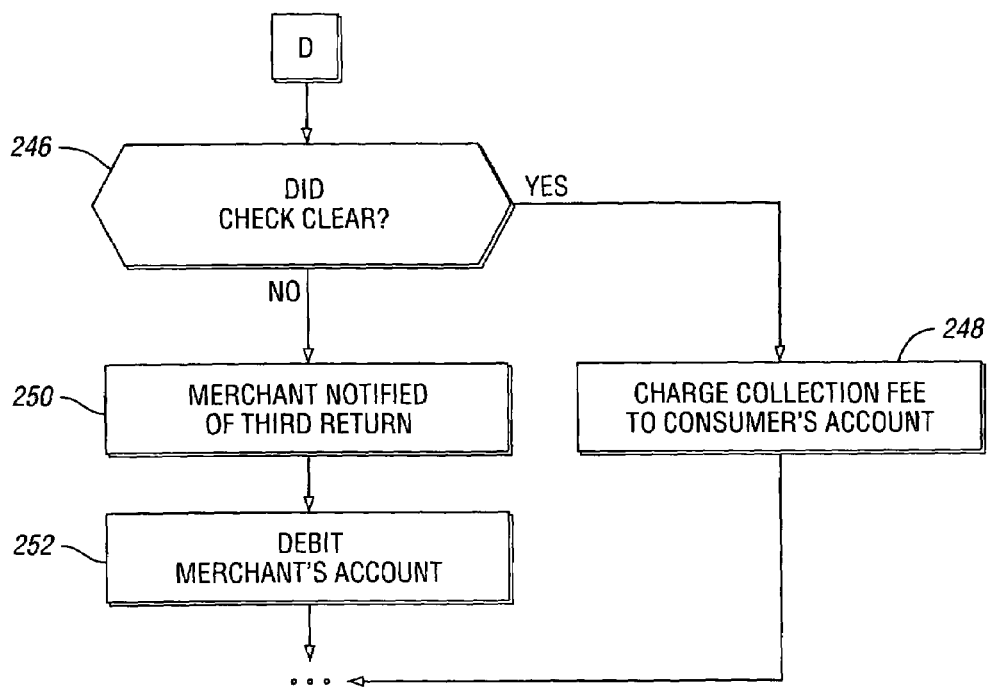

Process For Clearing And Writing A Check Submitted To A Merchant Via The Internet A preferred embodiment of the present invention provides a process for accepting, clearing and cashing a check, submitted by a consumer via the Internet and drawn on a conventional checking account, by an on-line merchant. With reference to FIG. 2, the process is initiated at block A, when, in block 202, a consumer has selected items to be purchased from a merchant's Internet web-site and selects, via the web-site's interface, the option of paying for the purchased goods by a check, drawn on a consumer's regular checking account. The web-site interface (not shown) prompts the consumer to enter check information necessary for the processing of the check transaction. Preferably, the interface provides the consumer with the image of a check, to be filled out by the consumer by typing in the same information normally found on the consumer's paper checks. Alternatively, the interface may simply request that the consumer enter the check information via a series of prompts. Required check information includes the full name of the checking account holder, the routing number for the checking account, the date on which the check is written, and the amount of the purchase. Additional information can be requested of the consumer, including the consumer's driver's license number, and the state where the driver's license was issued, the consumer's address, or other acceptable means of identification. Additionally, the interface may provide the consumer with the ability to fill out a "memo" line identifying the nature of the purchase for record keeping purposes. It is also preferred that the interface allow the consumer to create a printed record of this check information for record keeping purposes. After the check information has been input by the consumer, preferably, the interface prompts the consumer to verify the check information and authorize its use. Upon authorization, the check information is transmitted to the clearinghouse computer via the Internet or other suitable electronic means as indicated in block 204.

Upon receipt of the check information, the clearinghouse computer accesses a database of bad check writers and evaluates the check writing history of the consumer who has provided the check information 206. This bad-check writers database can be one or more of the multiple proprietary databases maintained by credit reporting companies, such as, for example, the National Check Information Services database. The evaluation is made based on criterion previously agreed to by the merchant and the operator of the clearinghouse. If the consumer's check writing history is acceptable, processing continues; otherwise the merchant is notified of the consumer's bad check writing history and processing ceases. Although it is preferred that the consumer's check writing history be verified, this step optional. Also, processing to check for abnormal usage of a checking account holder's account may be performed at this time, as an additional fraud detection device.

At or about the same time, the clearinghouse computer also verifies that the routing number submitted by the consumer satisfies the check digit algorithm 208. The series of digits identifying a checking account routing number are not randomly generated, but conform to a prescribed algorithm identifying both the bank at which the checking account is held, and the individual checking account itself. To avoid needless processing, and to attempt to detect fraud, the routing number submitted by the consumer is analyzed to verify that it conforms to the check digit algorithm. If the algorithm is not satisfied, processing ceases, and the merchant is notified, or alternatively, the clearinghouse or merchant web-site may notify the consumer that the check information submitted was incorrect.

Assuming that the routing number satisfies the check digit algorithm, the clearinghouse computer accesses a national database to verify that the routing number submitted by the consumer, which is normally associated with paper checks, is in fact the correct electronic routing number to be used in the subject transaction 210. It will be understood by one of ordinary skill in the art that frequently the so-called "paper routing number" printed on a consumer's check, which is used to cash and clear a paper check, does not match the routing number necessary for electronic funds transfer from the same account. Accordingly, as indicated in block 210, the clearinghouse computer determines whether the paper routing number submitted by the consumer matches the electronic routing number. If it does not, the check information submitted by the consumer is modified to indicate the proper electronic routing number as indicated in block 212. After this correction has been made, or if the paper routing number and the electronic routing number match, a conversion file is created for submission of the consumer's check information to the Federal Reserve's Automated Clearing House (ACH) for cashing and clearing the check. In a preferred embodiment of the present invention, this file will contain the check information of multiple consumers, submitted by multiple merchant web-sites. Also preferably, the conversion file is submitted to the Automated Clearing House on a daily basis. Transmission is presently accomplished via the FEDLINE, which is a dedicated land line for submission of information to the Automated Clearing House, but it will be understood that transmission can be accomplished by any means acceptable to the Federal Reserve. Upon submission of the check information to the Automated Clearing House, the consumer's checking account is debited by the amount indicated in the check information 216, and the merchant's account is credited by a similar amount 218.

In a preferred embodiment, the merchant is charged by the clearinghouse for the service of cashing consumers' checks at this time. Specifically, processing fees can be accessed against the amount credited to the merchant's account in the form of a discount fee, which is a percentage of the face value of the transaction, a transaction fee, which is a fixed fee for each transaction processed, and an administrative fee, which is a fee per merchant account. Alternatively, fees can be collected from the merchant's account at intervals throughout the month. To minimize processing time and on-line data bottlenecks it is also preferred that these fees, as well as the amount which is credited to each merchant's account, be calculated once, and that the merchants' accounts be credited on a once-per-day basis to reflect all transactions processed during the day, rather than on a transaction-by-transaction basis.

With further reference to FIG. 2, which is continued onto a second drawing sheet at block B, the clearinghouse computer awaits notification from the Automated Clearing House as to whether each consumer's check clears as indicated in block 220. If the First Presentment of the check clears the Automated Clearing House, the transaction is complete. The clearinghouse computer may then go on to other processing or operations, as indicated by the ellipsis shown in FIG. 2.

If the First Presentment is unsuccessful, the clearinghouse computer determines, from the Automated Clearing House return information, if the check was returned because the account was closed, a stop-payment order was issued on the check, fraud exists, or a Second Presentment of the check 222 is precluded for some other reason. If the check was thus returned, the clearinghouse computer notifies the merchant of the return and the reason for the return as indicated in block 224, and then debits the merchant's account by the amount by which it was previously credited in connection with the returned check 226. Because no Second Presentment is allowed, processing of other transactions can be performed.

If, however, the reason for the check return was either insufficient funds (NSF) or uncollected funds (UCF) then the check information is processed for immediate resubmission and a Second Presentment to the Automated Clearing House 226. Preferably, this Second Presentment is made on the same day that the clearinghouse computer is notified of the first return of the check. At substantially the same time that the check information is being processed for a Second Presentment, the merchant is notified of the first return 228. Preferably, this notification is accomplished by electronic means such as e-mail, and allows the merchant to delay shipment of the purchased goods, or take other remedial measures. It is also preferred that, rather than charging the merchant with a resubmittable first return transaction, the clearinghouse covers the negative float on the return item while the check is immediately resubmitted for clearing via the Automated Clearing House.

After the Automated Clearing House has processed the Second Presentment, the clearinghouse computer determines whether the Second Presentment of the check cleared 230. If the Second Presentment cleared, a collection fee is automatically debited to the consumer's account 231, ending the transaction and allowing other processing. With continued reference to FIG. 2, which is continued on to a third drawing sheet at block C, if the Second Presentment does not clear the Automated Clearing House, the merchant is notified of the second return to enable the merchant to take the remedial measures it deems necessary 232. Additionally, the merchant's account is debited by the amount it was initially credited in relation to subjection transaction 234. Preferably, the merchant's account is also credited by the amount of one or more of the fees charged to the merchant, such as the discount fee.

Based on the check return information from the Automated Clearing House, the clearinghouse computer determines why the Second Presentment of the check was returned 236. If the Second Presentment was returned for a reason other than insufficient funds or uncollected funds, no Third Presentment is allowed, and processing ends. If the Second Return was made because of insufficient funds or uncollected funds, the clearinghouse attempts to determine when and if sufficient funds are available in the consumer's checking account. Preferably, several attempts are made to verify whether sufficient funds exist over the course of a preselected time period, such as thirty or sixty days 238. It will be understood that this preselected time period is of arbitrary length agreed upon by the clearinghouse and the merchant. These inquiries as to the balance of the consumer's checking account may be made either via computer or by human personnel of the clearinghouse telephoning the bank which holds the consumer's checking account. As indicated in block 240, if the preselected time limit has not expired, and the clearinghouse has been unable to verify that sufficient funds exist, the process of checking the account for sufficient funds will continue. Preferably, inquiries about whether or not sufficient funds exist are made on a daily basis.

Once either the clearinghouse is able to verify that sufficient funds exist, or the preselected time periods expires, a Third Presentment of the check is made to the Automated Clearinghouse 242. Additionally, the merchant's account is again credited with the amount of the subject transaction, minus any associated processing fees 244. With further reference to FIG. 2, which is continued onto a fourth drawing page at block D, the clearinghouse computer determines whether or not the Third Presentment of the check cleared the Automated Clearing House 246. If the Third Presentment of the check does clear, a collection fee is charged electronically to the consumer's checking account 248, and the subject transaction is complete, allowing other processing. If the Third Presentment of the check does not clear, the merchant is notified of the third return 250 and the merchant's account is debited by the amount it was previously credited in relation to the subject transaction 252. The subjection transaction is then complete, allowing further processing.

It is also preferable to provide an interactive reporting system to allow on-line merchants to access the clearinghouse computer and obtain information on the checks which were submitted to them by consumers and which are currently being processed by the above-described method and apparatus. The interactive reporting system allows a merchant to examine both the status of a current transaction, as well as historical trends and the amount of fees paid by the merchant.

The following describes some alternative embodiments for accomplishing the present invention. For example, any type of computer such as a main frame, mini-computer, or personal computer, or computer configuration, such as a time sharing mainframe, local area network, or a stand alone personal computer, could be used for the present invention. Additionally, it should be understood that more than one computer can be used to implement the functions described as being performed by the clearing house computer and that the above-described method can be implemented in any one of a number suitable computer programming languages as will be recognized by one of ordinary skill in the art.

It will also be understood that the functions and methods described in the preferred embodiments described above can be varied and modified as necessary to satisfy the specific requirements of computer systems, as well as preferences as on-line merchants without departing from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for using one or more computers to electronically clear and cash a check submitted to an on-line merchant from an on-line consumer by electronic means comprising the steps of:

accepting an input of check information submitted by consumer;

verifying the accuracy of the check information;

comparing the routing number to a database to determine if the paper routing number provided by the consumer matches the electronic routing number needed to process the on-line transaction;

presenting the check information for clearing through the Federal Reserve's Automated Clearing House;

debiting the consumer's checking account from which the check was drawing in an amount indicated in the check information; and crediting the merchant's account in the amount indicated in the check information, wherein if the routing number provided by the consumer is a correct paper routing number, but not a correct electronic routing number, an additional step of modifying the check information to substitute the correct electronic routing number for the paper routing number provided by the consumer is performed.

2. A method for using one or more computers to electronically clear and cash a check submitted to an on-line merchant from an on-line consumer by electronic means comprising the steps of:

accepting an input of check information submitted by consumer;

verifying the accuracy of the check information;

presenting the check information for clearing through the Federal Reserve's Automated Clearing House;

debiting the consumers checking account from which the check was drawing in an amount indicated in the check information; and crediting the merchant's account in the amount indicated in the check information;

wherein if the check is returned by the Automated Clearing House, an additional processing step is conducted comprising determining the reason why the check was returned, wherein if the reason for the return is that the consumer's checking account has insufficient funds or uncollected funds, additional processing is performed comprising:
presenting the check information to the Automated Clearing House for a second presentment; and
notifying the merchant that the check was returned when it was first presented, wherein if the check is returned by the Automated Clearing House after the second presentment, additional processing is conducted comprising the steps of:
determining why the check was returned;
notifying the merchant that the check was returned after the second presentment; and
debiting the merchant's account by the amount indicated in the check information, wherein if the reason for the second return is that the consumer's checking account has insufficient funds or uncollected funds, additional processing is performed comprising:
during a predetermined time period, attempting to verify whether the consumer's account has funds available; and
presenting the check information to the Automated Clearing House for a third presentment either when the predetermined time period has expired or when the consumer's account has funds available, whichever occurs first, wherein the predetermined time period is between thirty and sixty days.

3. An apparatus comprising one or more computers capable of executing one or more programs to electronically clear and cash a check submitted to an on-line merchant from an on-line consumer by electronic means by carrying out the following steps:

accepting an input of check information submitted by a consumer;

verifying the accuracy of the check information;

presenting the check information for clearing through the Federal Reserve's Automated Clearing House;

debiting the consumer's checking account from which the check was drawn in an amount indicated in the check information; and crediting the merchant's account in the amount indicated in the check information, if the check is returned by the Automated Clearing House, additional processing is conducted to determine the reason why the check was returned, if the reason for the return is that the consumer's checking account has insufficient funds or uncollected funds, the apparatus forms additional processing comprising:
presenting the check information to the Automated Clearing House for a second presentment; and
notifying the merchant that the check was returned when it was first presented, if the check is returned by the Automated Clearing House after the second presentment, the apparatus performs additional processing comprising the steps of:
determining why the check was returned;
notifying the merchant that the check was returned after the second presentment; and
debiting the merchant's account by the amount indicated in the check information, if the reason for the second return is that the consumers checking account has insufficient funds or uncollected funds, the apparatus performs additional processing comprising:
during a predetermined time period, attempting to verify whether the consumer's account has funds available; and
presenting the check information to the Automated Clearing House for a third presentment either when the predetermined time period has expired or when the consumer's account has funds available, whichever occurs first, wherein the predetermined time period if between thirty and sixty days.

4. An apparatus comprising one or more computers capable of executing one or more programs to electronically clear and cash a check submitted to an on-line merchant from an on-line consumer by electronic means by carrying out the following steps:

accepting an input of check information submitted by a consumer;

verifying the accuracy of the check information;

presenting the check information for clearing through the Federal Reserve's Automated Clearing House;

debiting the consumer's checking account from which the check was drawn in an amount indicated in the check information; and crediting the merchant's account in the amount indicated in the check information, if the check is returned by the Automated Clearing House, additional processing is conducted to determine the reason why the check was returned, if the reason for the return is that the consumer's checking account has insufficient funds or uncollected funds, the apparatus forms additional processing comprising:
presenting the check information to the Automated Clearing House for a second presentment; and
notifying the merchant that the check was returned when it was first presented, if the check is returned by the Automated Clearing House after the second presentment, the apparatus performs additional processing comprising the steps of:
determining why the check was returned;
notifying the merchant that the check was returned after the second presentment; and
debiting the merchant's account by the amount indicated in the check information, if the reason for the second return is that the consumers checking account has insufficient funds or uncollected funds, the apparatus performs additional processing comprising:
during a predetermined time period, attempting to verify whether the consumer's account has funds available; and
presenting the check information to the Automated Clearing House for a third presentment either when the predetermined time period has expired or when the consumer's account has funds available, whichever occurs first, wherein the predetermined time period if between thirty and sixty days, wherein the on-line merchant can access the one or more computers to obtain information regarding the status of one or more checks which the merchant has submitted, wherein the merchant can determine whether or not a processing fee has been charged and the dollar amount of any such charge.

5. An apparatus comprising one or more computers capable of executing one or more programs to electronically clear and cash a check submitted to an on-line merchant from an on-line consumer by electronic means by carrying out the following steps:

accepting an input of check information submitted by a consumer;

verifying the accuracy of the check information;

presenting the check information for clearing through the Federal Reserve's Automated Clearing House;

debiting the consumer's checking account from which the check was drawn in an amount indicated in the check information; and crediting the merchant's account in the amount indicated in the check information, if the check is returned by the Automated Clearing House, additional processing is conducted to determine the reason why the check was returned, if the reason for the return is that the consumer's checking account has insufficient funds or uncollected funds, the apparatus forms additional processing comprising:

presenting the check information to the Automated Clearing House for a second presentment; and notifying the merchant that the check was returned when it was first presented, if the check is returned by the Automated Clearing House after the second presentment, the apparatus performs additional processing comprising the steps of:

determining why the check was returned;

notifying the merchant that the check was returned after the second presentment; and debiting the merchant's account by the amount indicated in the check information, if the reason for the second return is that the consumers checking account has insufficient funds or uncollected funds, the apparatus performs additional processing comprising:

during a predetermined time period, attempting to verify whether the consumer's account has funds available; and presenting the check information to the Automated Clearing House for a third presentment either when the predetermined time period has expired or when the consumer's account has funds available, whichever occurs first, wherein the predetermined time period if between about thirty and sixty days, wherein the on-line merchant can access the one or more computers to obtain information regarding the status of one or more checks which the merchant has submitted, wherein the merchant can obtain a history of the processing of a check submitted to the on-line check cashing system.

6. An article of manufacture comprising a computer program carrier readable by a computer and embodying one or more instructions executable by the computer to perform method steps for electronically clearing and cashing a check submitted to an on-line merchant from an on-line consumer by electronic means, the method comprising the steps of:

accepting the input of check information submitted by a consumer;

verifying the accuracy of the check information; evaluating the consumer's check writing history by accessing a database of bad check writers;

verifying the check information to ensure that the bank routing number submitted by the consumer is valid and correct, wherein if the routing number provided by the consumer is a correct paper routing number, but not a correct electronic routing number, an additional step of modifying the check information to substitute the correct electronic routing number for the paper routing number provided by the consumer is performed;

presenting the check information for clearing through the Federal Reserves' Automated Clearing House;

debiting the consumer's checking account from which the check was drawn in an amount indicated in the check information; and crediting the merchant's account in the amount indicated in the check information.

* * * * *